June 19, 1962 — A. F. OLD — 3,039,165
METHOD AND APPARATUS FOR PRODUCTION OF
LIGHTWEIGHT AGGREGATE FROM DUST
Filed April 28, 1954 — 3 Sheets-Sheet 1
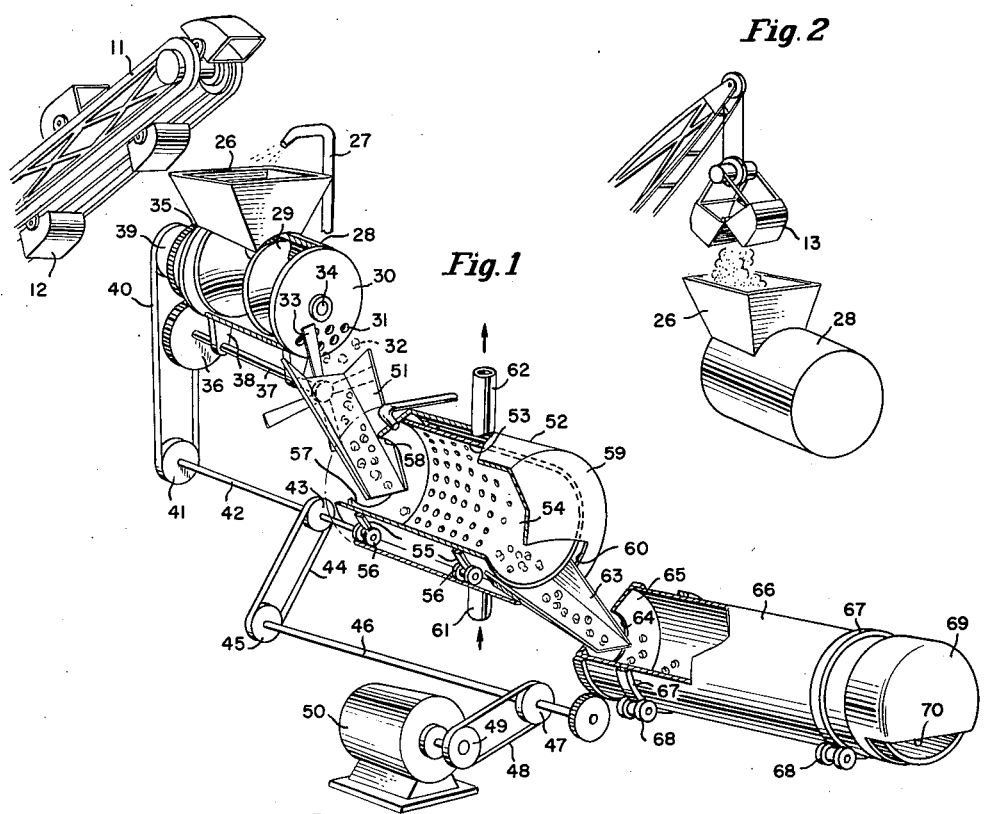
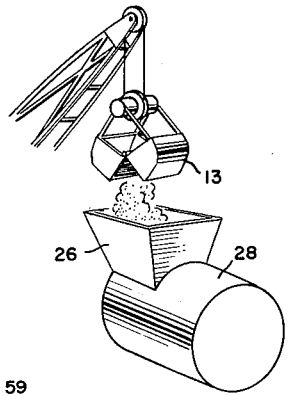
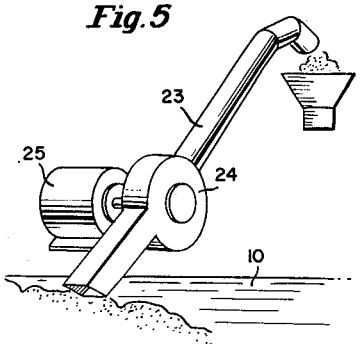
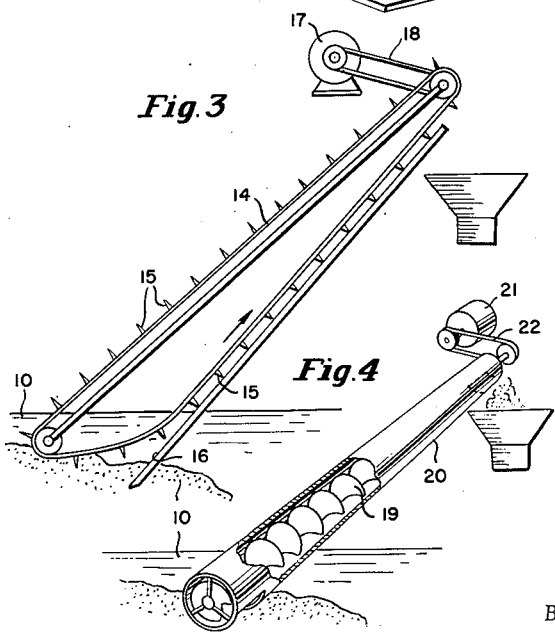
INVENTOR
A. F. Old
BY
ATTORNEY

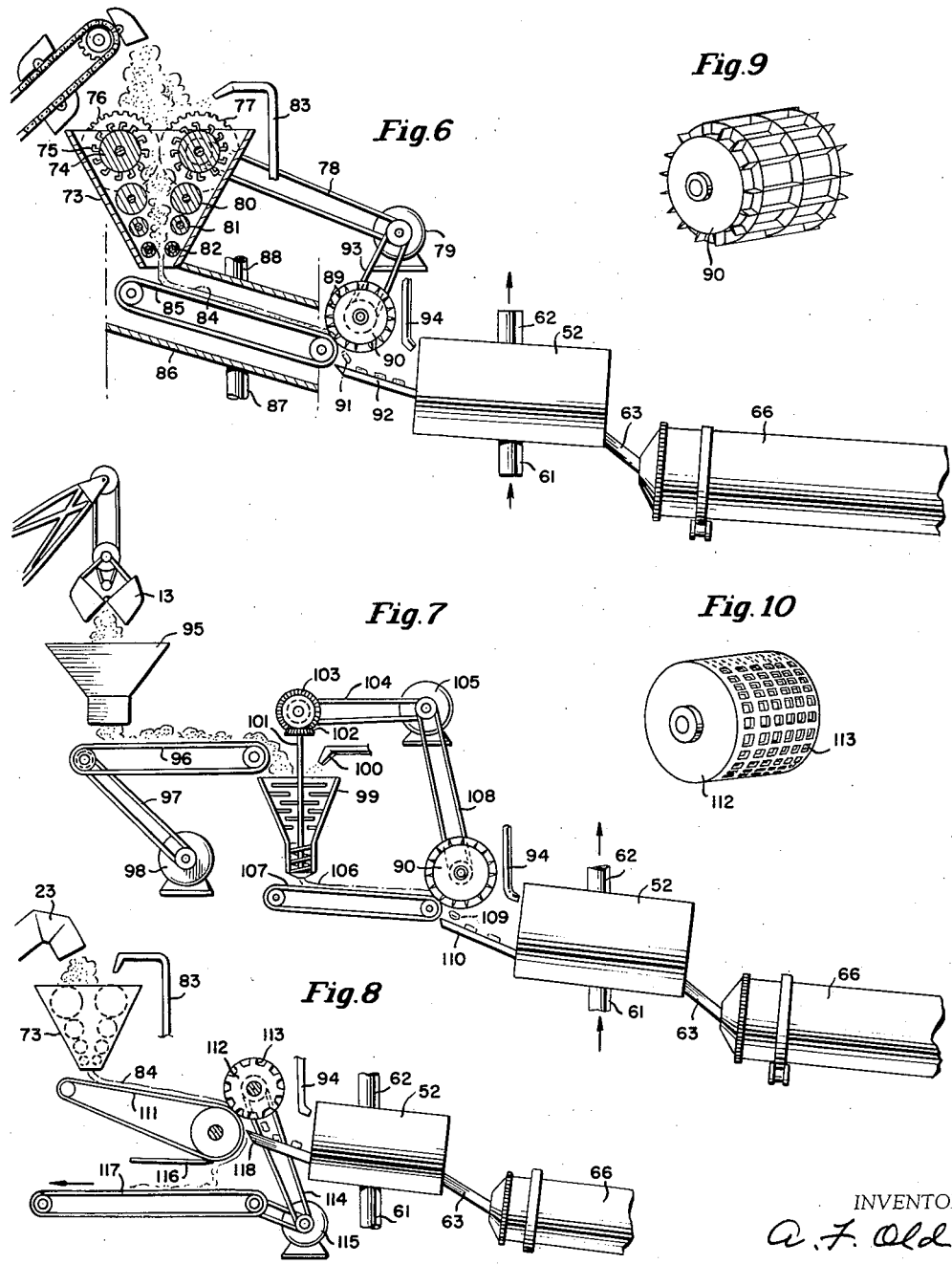

June 19, 1962   A. F. OLD   3,039,165
METHOD AND APPARATUS FOR PRODUCTION OF
LIGHTWEIGHT AGGREGATE FROM DUST
Filed April 28, 1954   3 Sheets-Sheet 3
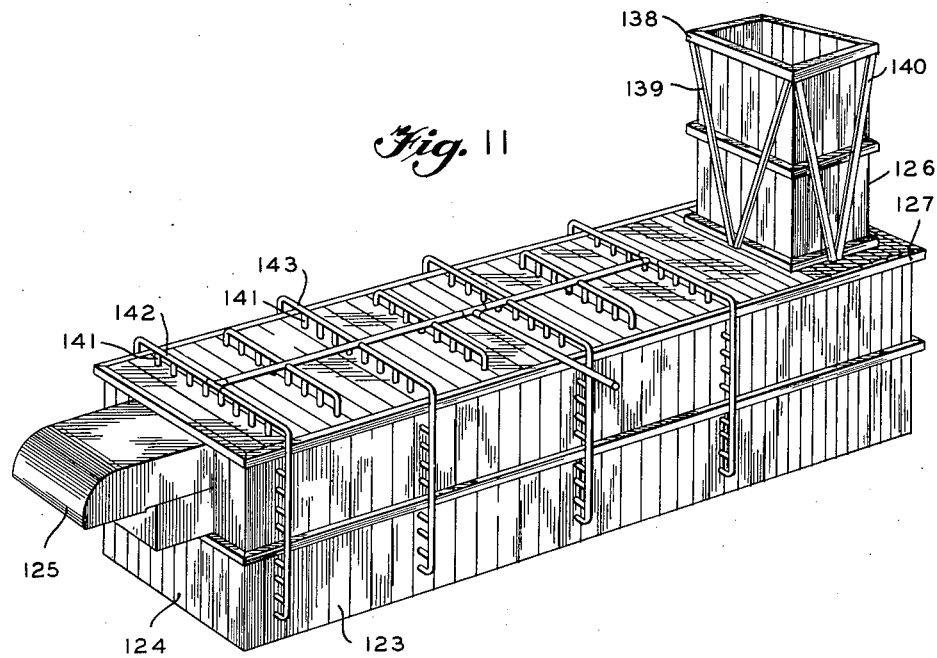
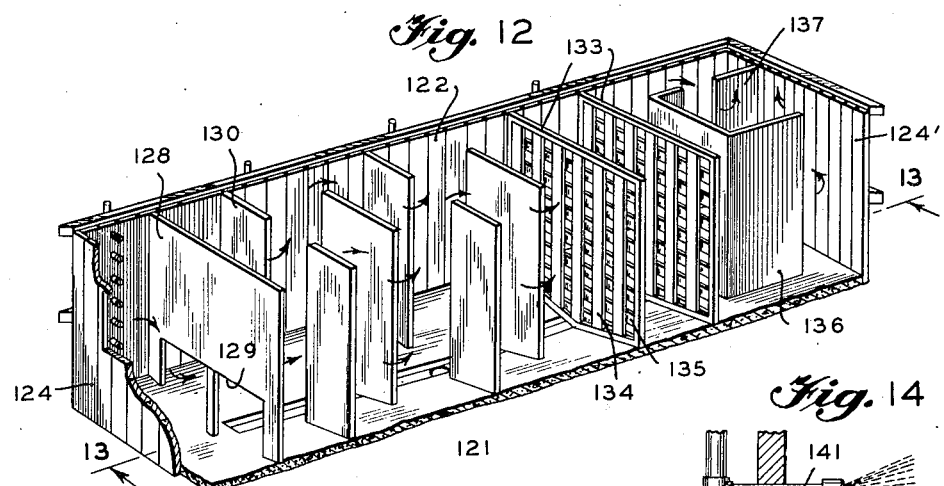
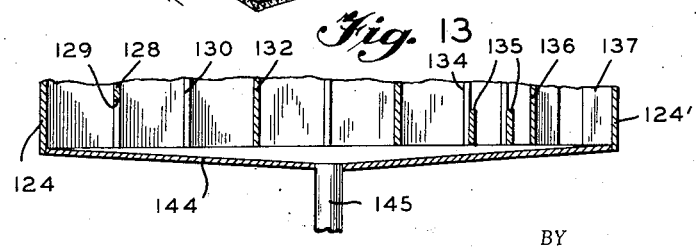
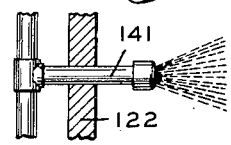
INVENTOR
A. F. Old
BY
A. Yates Dowell
ATTORNEY United States Patent Office 3,039,165
Patented June 19, 1962

3,039,165
METHOD AND APPARATUS FOR PRODUCTION OF LIGHTWEIGHT AGGREGATE FROM DUST
Albert Floyd Old, Bremo Bluff, Va., assignor to Solite Corporation, a corporation of Virgina
Filed Apr. 28, 1954, Ser. No. 426,101
9 Claims. (Cl. 25—156)

This invention relates to the production of plastic compositions, and more particularly to the production of a lightweight substance to be used as the greater portion of the bulk or mass of a cementitious material thereby obtaining a product of lower specific gravity.

The invention relates not only to the method of producing lightweight aggregate but to the mechanism or equipment employed for carrying out the method. Specifically, the invention relates to the production of a lightweight aggregate from waste dust including that collected during the process of manufacturing lightweight aggregate in a rotary kiln, sintering machine, or hearth, and to apparatus or equipment employed in such manufacture.

In the production of lightweight aggregate such for example as that disclosed in co-pending application, 361,888, filed June 15, 1953, now Patent No. 2,696,274, of which this application is a continuation-in-part, slate which contains approximately 5% moisture is crushed, graded and fed into a kiln where it is heated to approximately 2300° F. This heat causes chemical reaction and the release of gaseous products and dust which is a nuisance to animal and plant life. Such co-pending application includes a system for removing a large part of the dust and undesirable substances and flushing them away as waste with water.

The present invention is directed to the removal of dust from air, flushing it from the removal chamber with water as indicated in the above mentioned co-pending application and making use of such removed dust. One way in which it may be used is in the production of lightweight aggregate. Such dust is composed substantially of silica—56.72%, aluminum oxide—20%, iron oxide—10%, calcium and magnesium oxides—2%, sulfur trioxide, sodium, potassium and other oxides and moisture—11.28%. Due to the fineness of the material, most of it will pass through a No. 4 screen. The present invention contemplates the use of dust of this character whether it be obtained as described in co-pending application 361,888 or dust collected or produced by other mechanical, electro-static or other means.

It is an object of the invention to provide the necessary apparatus or equipment and with the same to produce lightweight aggregate from waste dust or other fine material otherwise obtained or produced.

Another object of the invention is to provide apparatus or equipment for manufacturing lightweight aggregate from dust, or other fine material.

A further object of the invention is to provide means for removing dust or relatively fine particles from air, utilizing moisture in such removal, collecting the dust and water, allowing water to escape from the mass, adding or removing moisture, detaching portions of the mass, subjecting such portions to rolling and drying action to form pellets, and subjecting such pellets to heat to expand and bond together the material of the pellet to thereby produce a lightweight aggregate of individually sealed and sized particles.

Further objects and advantages of the invention will be apparent from the following description taken in conjunction with the accompanying drawings, wherein:

FIG. 1 is a diagrammatic view, partly in section, illustrating one embodiment of the invention;

FIG. 2, a similar fragmentary view illustrating the use of a clamshell bucket for supplying the fine material to the hopper;

FIG. 3, a side elevation of a modified form of conveyor for supplying the material to the hopper;

FIG. 4, a fragmentary perspective of an auger or screw conveyor for supplying material to the hopper;

FIG. 5, a fragmentary perspective of pneumatic or hydraulic means for supplying material to the hopper;

FIG. 6, a diagrammatic view of a system having a modified form of hopper shown in section including power means for advancing the material and a rotary detaching drum for separating the material into pellets;

FIG. 7, a diagrammatic view of a slightly modified system including a pugmill;

FIG. 8, a diagrammatic view of a modified system with the pelletizing drum for sub-dividing the material into the form of pellets;

FIG. 9, a perspective of the detaching drum of FIGS. 6 and 7; and

FIG. 10, a perspective of the drum of FIG. 8;

FIG. 11, a perspective of a separating chamber for the separation of dust from air;

FIG. 12, a perspective similar to FIG. 11 with parts broken away to disclose the interior of the treating chamber;

FIG. 13, a fragmentary sectional view of the lower portion of the treating chamber and drain through which the dust and water pass from the chamber; and FIG. 14, a fragmentary detailed view illustrating one of the spray nozzles.

Briefly stated, the invention comprises the production of lightweight aggregate and includes removal of dust from air or from a gaseous mixture, picking up a deposit of fine dust, conveying such dust to a hopper, adding or removing moisture, incorporating or removing such moisture in the mix, providing small particles or pellets, producing rolling of said pellets including drying the same and subjecting such pellets to heat treatment in a kiln to produce lightweight aggregate.

With continued reference to the drawings, dust may be removed from air and collected as for example in a pond 10 as disclosed in FIGS. 3, 4, and 5, and from a source of this or other character it may be removed in any desired manner, as for example, as shown in FIG. 1 by a conveyor 11 having buckets 12 and referred to as a bucket conveyor, or by a clamshell bucket 13 as shown in FIG. 2. Instead of this type of a structure for elevating the material, a conveyor 14 may be employed having cleats 15 which engage the material from the pond 10 and carry it upwardly along an inclined surface 16 until it is discharged from the upper end of such surface. The conveyors 11 and 14 may be driven in any desired manner, as for example, by a motor 17 through a belt 18.

Instead of the conveyors of FIGS. 1 and 3, an auger or screw conveyor may be employed, comprising an auger or screw 19 in a tube 20, such auger being driven by a motor 21 or other source of power through a belt 22.

If preferred, the dust may be transferred through a pipe 23 by means of a pump 24 driven by a motor 25. Conditions will determine the type of conveyor most appropriate for moving the dust deposit.

It is desired to transform the dust into pellets and to subject such pellets to heat in a kiln for producing lightweight aggregate. The moisture content of the dust will determine to a degree the manner in which the material is treated.

In FIG. 1 is disclosed a system in which material from the buckets 12 of the conveyor 11 is deposited in the hopper 26, water being supplied to the material if and as needed through a pipe 27. The material passes by gravity into a housing 28 containing a screw 29 which moves the mass axially of the housing 28, towards the end 30 which is provided with extrusion openings 31 through which the mud is forced so that it may be divided into pellets 32 either by falling of its own accord or by detachment by means of a rotary knife 33 having a plurality of blades, as for example, four.

The screw 29 is mounted on a shaft 34 having fixed thereon a gear 35 which meshes with the gear 36 on shaft 37 mounted in brackets 38. On the opposite end of the shaft 37 carrying the gear 36 is mounted a rotary four-blade knife 33. A pulley 39 is fixed on the shaft 34 of the screw 29 and drives a belt 40 which in turn drives a pulley 41 on a shaft 42. A pulley 43 is fixed on the shaft 42 and by means of a belt 44 drives a pulley 45 and a shaft 46 on which said pulley is fixed. The shaft 46 has a pulley 47 affixed thereto and driven by means of a belt 48 from the pulley 49 of a motor 50.

The pellets which are extruded through the openings 31 drop onto a chute 51 and roll downwardly into a dryer having an outer casing 52 and a rotary inner casing 53 with openings or perforations 54. The cylinder 53 is provided with a pair of reinforcing rings or hoops 55, each of which is supported by a pair of transversely spaced parallel rollers 56, one of which is fixed to the shaft 42 to be rotated and thereby produce rotation of the perforated cylinder 53. The casing 52 is provided with an end plate 57 having an opening 58 providing admission into the interior of the perforated cylinder 53. The cylinder 52 is provided with an end member 59 having an opening 60 from which the pellets may be discharged from the perforated cylinder 53. The cylinder 52 is provided with an air inlet tube 61 and an air outlet tube 62 for the admission and discharge of drying air. Thus pellets entering the perforated cylinder are simultaneously rotated and dried and subsequently discharged down a chute 63 through an opening 64 in the end 65 of a rotary kiln 66, such kiln being provided with reinforcing rings or hoops 67 which bear upon pairs of spaced parallel rollers 68. Fixed on the shaft 46 driven from the motor 50, is a gear 46' which drives a girth or ring gear 66' on the outer end of the kiln 66 and by means of which the kiln is rotated. The kiln 66 is provided with a discharge end closure 69 having a discharge opening 70 through which the lightweight aggregate ready to be processed to provide the finished product is discharged.

The screw 29, the knife 33, the drying cylinder 53 and the kiln 66 are all rotated from a single source of power and the material deposited in the hopper 26 will have excess moisture extracted before the pellets are extruded whereupon these pellets will roll down the chute 51, pass into the drying cylinder 53, roll by gravity down the chute 63 and pass directly into the kiln for the requisite heat treatment.

If desired, a hopper 73 may be employed having a series of rollers feeding the material downwardly and adding or extracting moisture. Such rollers may comprise a pair 74 having material-engaging fingers 75 for forcing the material downwardly in the hopper. The rollers 74 may be provided with meshing gears 76 and 77 driven through a belt 78 from a motor 79. Spaced free rotating pairs of rollers 80, 81 and 82 of progressively diminishing diameter are preferably located in the hopper 74 beneath the rollers 76 and 77.

The material in wet condition or moistened by means of a water supply pipe 83 moves downwardly in and from the lower end of the hopper in the form of a ribbon 84 which engages an inclined conveyor 85 located within a casing 86 through which air at the desired temperature may be forced, entering through an inlet 87 and being discharged through an exit 88. The conveyor 85 may be caused to move in any desired manner as for example, by the weight and force of the ribbon 84 of the material discharged from the hopper and when this ribbon reaches the lower end of the conveyor, it is engaged by the blades 89 of a detaching drum 90 which separates particles 91 of the material from the ribbon 84 so that such particles may pass by gravity down a chute 92. The detaching drum 90 is rotated by means of a belt 93 from the motor 79 which likewise drives the upper set of rollers of the hopper.

If desired, the pellets 91 may be supplied with water through a pipe 94, as such pellets pass into a pelletizer having an outer casing 52 and inlet and outlet tubes 61 and 62 through which hot air is admitted and discharged, such pelletizer corresponding to that shown in FIG. 1. In the pelletizer the pellets will be rolled and dried and discharged through a chute 63 into the kiln 66 which corresponds to that of FIG. 1.

In the system of FIG. 7 material is supplied by a clamshell bucket 13 to the hopper 95 and onto a conveyor 96 driven through belt 97 by a motor 98. By means of the conveyor 96, the relatively fine material is deposited in a pugmill 99 to which water is supplied through a pipe 100. The mixing shaft 101 of the pugmill is provided with a beveled gear 102 on its upper end which is engaged by a complementary beveled gear 103 driven by belt 104 from a motor 105. A ribbon 106 of the material is carried by an inclined conveyor 107 in contact with a detaching drum 90 driven by belt 108 from the motor 105.

Segments 109 of the material detached from the ribbon 106 pass by gravity down a chute 110 into a pelletizer having a casing 52 and an inlet 61 and an outlet 62 for hot air, such pelletizer corresponding to that of FIGS. 1 and 6. The material after having been tumbled and dried in the pelletizer passes down a chute 63 into a kiln 66 corresponding to that of FIGS. 1 and 6.

In FIG. 8 material is discharged through a hydraulic or pneumatic tube 23 into a hopper 73 containing rollers and may be supplied with water if such be desired through the pipe 83, and a ribbon of material travels down a conveyor 111 into contact with a pellet-forming drum 112 having pockets 113 in its periphery. The drum 112 is driven by a belt 114 from a motor 115 or other source of power. When the drum 112 engages the ribbon 84, it will receive only a portion of the material of such ribbon and the residue will pass downwardly and be removed from the conveyor by means of a knife 116, the discharged material falling onto a conveyor 117 and being carried back for reuse.

Pellets dropping from the drum 112 pass down a chute 118 into a pelletizer including an outer casing 52, a hot air inlet 61 and a hot air outlet 62, all as previously described in regard to FIGS. 1, 6 and 7. The material is then discharged through chute 63 into a kiln 66, as described in such figures.

It will be apparent that applicant prepares small pellets from fine material either salvaged from dust removed from the air and flushed into a pond or from other source. These pellets are treated to remove excessive moisture and are then subjected to heat treatment in a kiln to produce lightweight aggregate.

If desired, an expanding or bloating agent may be added to the moist material or slurry prior to the formation or production of the pellets to aid in reducing the weight or specific gravity of the finished product. Agents of this nature may include iron pyrites, sulfur, and/or others.

The dust separator shown in FIG. 11 to 14 inclusive has one or more entrances 120 through which dust-laden air from kilns is admitted for treatment to remove the dust therefrom.

The treating chamber comprises a bottom 121, side walls 122 and 123 and end walls 124 and 124' respectively. These walls are composed of wood, fir having been found satisfactory, such wood having been cut into lumber and treated to render it resistant to heat, acid, or other chemical agents, although treatment is not necessary. The lumber of which the walls are formed is disposed in edge-to-edge relation and swells when wet and closes any cracks between the same.

These walls preferably are of a size to provide a chamber approximately 15 feet each in width and height and a length from 50 feet to 70 feet. If desired, the lumber may have interfitting tongues and grooves to insure tighter joints, although it has been found in practice that tight joints are formed by the swelling of the material.

One or more entrances 120 are employed for the admission of air to be treated into the treating chamber and a relatively large discharge stack 126 extends upwardly from the opposite end of the treating chamber through which air after it has been treated to remove dust may pass to the atmosphere. If desired, the treating chamber may have its side and end walls provided with horizontally disposed reinforcing supports 127.

Baffles are employed within the treating chamber for increasing the length of the path travelled by the mixture treated in the chamber. A first baffle 128 is provided with an opening 129 extending from side to side along its bottom edge so that when the mixture to be treated enters the chamber it will engage such baffle and flow beneath the same. Spaced rearwardly of the chamber from the first baffle, are side baffles 130 and 131 which extend along each side of the chamber from top to bottom of the same and terminate inwardly near the center and provide a narrow central vertical passageway between their adjacent edges. Beyond the side baffles 130 and 131 is located a center baffle 132 extending from top to bottom of the chamber with its side edges spaced from the sides of the chamber so that the flow will be around each side of the baffle. A plurality of side baffles 130 and 131 and center baffles 132 may be employed in accordance with requirements and to insure thorough engagement of the mixture treated with the surfaces of the baffles.

In order to provide a finishing touch to the treatment of the mixture one or more baffles extending from top to bottom and side to side of the chamber may be employed, such baffles are formed of cross strips or lattice work in frames 133 and vertical and horizontal slats 134 and 135, thus forming a baffle located transversely of the chamber and having passage forming openings distributed over substantially the area of the baffles. Since the vertical slats are on the inlet side, minimum shelf space will be provided for the accumulation of solid matter.

At the discharge end of the chamber, additional baffles 136 and 137 are provided, the baffle 136 having a central portion and side portions of different lengths, the air being caused to pass around such side portions to enter the discharge stack. The baffle 137 may be added to restrict the passage around the short side of the baffle 136. From this space within the area enclosed by the baffle 136 within the chamber the remains of the treated mixture may pass upwardly through the stack 126 to the atmosphere such stack being of the necessary cross sectional area and height so that heated air will flow upwardly and be discharged with a chimney effect or in an accelerated manner. If desired, the stack 126 may have reinforcing supports 138, 139 and 140.

In order to moisten the mixture treated to increase the specific gravity of and wash out undesirable substances and particularly solid particles, water is supplied in abundance to the treating chamber and is distributed therein by means of fog nozzles of conventional construction on the ends of depending pipes 141, extending from headers 142 and 143 through the ceiling on top of the treating chamber. Through these nozzles water is discharged in a horizontal fog or blanket which gravitates to the bottom of the chamber intimately contacting the mixture in the downward movement of the fog and the horizontal movement of the mixture in its flow through the chamber.

In order to insure thorough wetting of the substance treated, the chamber is provided with vertical rows of pipes 146 having inwardly directed spray nozzles along the side wall of the chamber. The spray nozzles at one side of the chamber are opposite the spray nozzles on the other side of the chamber and such spray nozzles are of conventional construction and of a character to cause the projection of a substantially solid or continuous curtain of water across the chamber. The introduction of water in the manner described insures the desired contact in washing of the mixture treated.

The bottom of the chamber is provided with a trough or sump 144 and a discharge outlet 145 so that water and substance removed from the mixture treated can be readily discharged from the chamber.

It will be obvious to those skilled in the art that various changes may be made in this device without departing from the spirit of the invention and therefore the invention is not limited by that which is shown in the drawing and described in the specification but only as indicated in the appended claims.

What is claimed is:

1. Apparatus for removing dust from air and producing lightweight aggregate therefrom, comprising wall structure defining a chamber having an inlet for air containing dust and a discharge for air from which dust has been removed, baffles in staggered relation in said chamber, spray nozzles in said chamber distributed along the upper portion and in upright opposed rows along the side walls of said chamber for the supply of moisture in a substantially horizontal fog in the upper portion of said chamber and in curtain forming sheets from the sides of said chamber, a sluiceway at the bottom of said chamber for the exit of water with dust particles which have been removed from the air, apparatus for treating such dust comprising a hopper, means for directing such dust particles into said hopper, moisture modifying means associated with said hopper for controlling the moisture content of the mass, means for dividing the mass into smaller units, means for advancing tumbling and subjecting said smaller units to moisture and temperature modifying media, means for further advancing and rolling said smaller units including a kiln for subjecting said smaller units to heat sufficient to expand and harden the same.

2. Apparatus for removing dust from air and producing lightweight aggregate therefrom, comprising structure for removing dust from air, apparatus for treating such dust comprising a hopper, means for directing such dust particles into said hopper, moisture modifying means associated with said hopper for controlling the moisture content of the mass, means for dividing the mass into smaller units, means for advancing tumbling and subjecting said smaller units to moisture and temperature modifying media, means for further advancing and rolling said smaller units including a kiln for subjecting said smaller units to heat sufficient to expand and crystallize the same.

3. Apparatus for removing dust from air and producing lightweight aggregate comprising structure for removing dust from air, mechanism for moving such material, a hopper for receiving said material, means for compressing the material to remove excess moisture and for extruding said material, means for detaching extruded portions of said material, a chute down which said detached portions may be tumbled, a perforated rolling and drying cylinder, means for forcing air through the perforations in the cylinder for drying and rolling said detached portions to form pellets, means for discharging said pellets, and a kiln for subjecting said pellets to the action of heat to produce a lightweight aggregate of individually sealed and sized heat-treated particles.

4. The method of producing a lightweight aggregate comprising the steps of treating dust laden air to remove dust, by wetting and directing the air against a series of baffles, removing water by compressing the material, detaching portions of the material to provide smaller independent units, advancing, tumbling, and subjecting said units to treatment to modify the moisture content thereof, further advancing and subjecting said units to heat treatment sufficient to expand and harden the same to produce a lightweight aggregate of individually sealed and sized particles devoid of laminations and with a protective surface skin.

5. The method of producing lightweight aggregate comprising the steps of treating dust laden air to remove dust therefrom forming independent bodies of small generally uniform size from said dust, advancing, tumbling, and removing moisture from said bodies, subjecting said bodies to heat treatment sufficient to expand and harden the same and to produce a lightweight aggregate substantially free from separation-promoting laminations and with a protective surface skin.

6. The method of producing a lightweight aggregate consisting essentially of the steps of conveying a mass of pulverized earth, treating said material to provide the desired moisture content for pelletizing, detaching portions of such material of controlled moisture content, subjecting such portions to rolling and drying action to form pellets, and subjecting such pellets to heat to expand and bond together the material of such pellets to produce a lightweight aggregate of individually sealed and sized particles.

7. The method of producing a lightweight aggregate consisting essentially in the steps of removing earth dust from a dust laden gaseous mixture and binding the dust into a mass by moisture, controlling the moisture content of the mass, dividing said mass into small portions, subjecting said portions to tumbling and drying action and thereafter to heat sufficient to expand and harden the same into a stable mass suitable for use as a lightweight aggregate.

8. A method of producing a lightweight aggregate comprising the steps of treating a dust laden gaseous mixture discharged from the smoke stack of a kiln to remove fine solid particles by wetting and directing the gaseous mixture against a series of surfaces in sequence to form a slurry including said particles, collecting said particles, removing some of the moisture content therefrom, detaching portions of the collected material to provide smaller independent units, advancing tumbling and subjecting said units to reduce their moisture content, further advancing and subjecting said units to heat treatment to produce a lightweight aggregate of individually sealed and sized particles without laminations and with a protective surface skin.

9. A method of producing a lightweight aggregate by recovering material from a gaseous mixture, including solid particles, discharged from the smoke stack of a kiln, removing fine solid particles, wetting and directing such gaseous mixture against a series of baffles to remove particles in the wetting agent, collecting the wet particles, subjecting said particles to a drying action, agitating said material and controlling the moisture content, nodulizing said material and subjecting the same to a heat treatment to expand the same and produce a lightweight aggregate of realtively fine texture in which the particles are of substantially uniform size and the end product is without lamination but contains a protective surface skin.

References Cited in the file of this patent

UNITED STATES PATENTS

| | | |
|---|---|---|
| 1,805,020 | Smith | May 12, 1931 |
| 1,892,074 | Nielsen | Dec. 27, 1932 |
| 1,923,420 | Derby | Aug. 22, 1933 |
| 2,103,746 | Guth | Dec. 28, 1937 |
| 2,457,962 | Whaley | Jan. 4, 1949 |
| 2,457,963 | Thodos | Jan. 4, 1949 |
| 2,478,757 | Foster | Aug. 9, 1949 |
| 2,569,323 | Maynard | Sept. 25, 1951 |